United States Patent
Murphy et al.

(10) Patent No.: US 9,394,472 B2
(45) Date of Patent: Jul. 19, 2016

(54) LOW FLUID LOSS DRILLING FLUID COMPOSITIONS COMPRISING DIBLOCK COPOLYMERS

(71) Applicant: Kraton Polymers US LLC, Houston, TX (US)

(72) Inventors: Erin Murphy, Katy, TX (US); Robert Bening, Katy, TX (US)

(73) Assignee: Kraton Polymers U.S. LLC, Houston, TX (US)

( * ) Notice: Subject to any disclaimer, the term of this patent is extended or adjusted under 35 U.S.C. 154(b) by 146 days.

(21) Appl. No.: 14/226,890

(22) Filed: Mar. 27, 2014

(65) Prior Publication Data

US 2015/0275065 A1    Oct. 1, 2015

(51) Int. Cl.
    *C09K 8/32* (2006.01)

(52) U.S. Cl.
    CPC .............. *C09K 8/32* (2013.01); *C09K 2208/00* (2013.01)

(58) Field of Classification Search
    None
    See application file for complete search history.

(56) References Cited

U.S. PATENT DOCUMENTS

| | | | |
|---|---|---|---|
| RE27,145 E | 6/1971 | Jones | |
| 3,595,942 A | 7/1971 | Wald et al. | |
| 3,634,549 A | 1/1972 | Shaw et al. | |
| 3,670,054 A | 6/1972 | De La Mare et al. | |
| 3,700,633 A | 10/1972 | Wald et al. | |
| 4,039,593 A | 8/1977 | Kamienski et al. | |
| 4,086,171 A | 4/1978 | Wood et al. | |
| 5,883,054 A | 3/1999 | Hernandez et al. | |
| 5,909,779 A | 6/1999 | Patel et al. | |
| 5,925,182 A | 7/1999 | Patel et al. | |
| 6,017,854 A * | 1/2000 | Van Slyke | C09K 8/32 507/103 |
| 6,034,037 A | 3/2000 | van Slyke | |
| 6,832,651 B2 | 12/2004 | Ravi et al. | |
| 7,462,580 B2 | 12/2008 | Kirsner et al. | |
| 2013/0225020 A1 | 8/2013 | Flood et al. | |

FOREIGN PATENT DOCUMENTS

WO    2004022668 A1    3/2004

OTHER PUBLICATIONS

International Search Report and Written Opinion dated Jun. 22, 2015.
Foreign communication from a related counterpart application—Search Report, Taiwan Patent Application No. 104108351, Nov. 6, 2015, 2 pages.

* cited by examiner

*Primary Examiner* — Alicia Bland
(74) *Attorney, Agent, or Firm* — Clements Bernard PLLC; Ekatherina Serysheva

(57) ABSTRACT

The invention relates to a selectively hydrogenated isoprene-styrene diblock copolymer having a polystyrene content of at least 40 wt. %, which when added to an oil-based mud composition, substantially reduces fluid loss. The polystyrene in the diblock has a true molecular weight greater than 60 kg/mole and the total apparent molecular weight of the diblock copolymer is at least 160 kg/mole. The drilling mud that contains about 0.5 pounds per barrel to about 10 pounds per barrel of a selectively hydrogenated isoprene-styrene diblock copolymer and a weighting agent, resulting in a drilling fluid composition exhibiting good suspension of the weighting agent and improved fluid loss performance.

19 Claims, No Drawings

LOW FLUID LOSS DRILLING FLUID COMPOSITIONS COMPRISING DIBLOCK COPOLYMERS

FIELD OF THE INVENTION

The invention relates to a drilling fluid composition comprising a selectively hydrogenated isoprene-styrene diblock copolymer, which when added to an oil-based mud composition, substantially reduces fluid loss. Further, the drilling fluid composition has a balance of rheological properties after aging at 300° F. such as viscosity and gel strength. The invention further relates to a selectively hydrogenated isoprene-styrene diblock copolymer. The polystyrene in the diblock has a polystyrene content of at least 40 wt. %, a polystyrene block true molecular weight greater than 60 kg/mole and the total apparent molecular weight of the diblock copolymer is at least 160 kg/mole.

BACKGROUND OF THE INVENTION

Drilling muds are used in the process of drilling bore holes in subterranean deposits for gas and/or oil production. The boring is accomplished by well drilling tools and a drilling fluid. Drilling muds serve to cool and lubricate the drill bits, to carry the cuttings to the surface as the drilling fluid is circulated in and out of the well, to support at least part of the weight of the drilling pipe and drill bit, to provide a hydrostatic pressure head to prevent caving in of the walls of the well bore, to deposit on the surface of the well bore a filter cake which acts as a thin, semi-pervious layer to prevent undue passage therethrough of drilling muds, and to perform other functions as are well-known in the drilling art. It is important that the drilling fluid exhibit a relatively low rate of filtration or fluid loss in addition to having desirable rheological properties, such as viscosity and gel strength.

Drilling muds contain additives and conditioning agents that are important in determining the fluid loss properties of the drilling fluid, as well as inhibiting shale and clay disintegration. U.S. Pat. No. 5,909,779 discloses that such additives or agents include modified lignite, polymers, oxidized asphalt, gilsonite, humates prepared by reacting humic acid with amide or polyalkyl polyamines. The amount of fluid loss agent added to the drilling mud composition is usually less than 10% by weight, and preferably, less than 5% by weight of the drilling mud.

U.S. Pat. No. 5,883,054 discloses adding a random styrene-butadiene (SBR) copolymer having an average molecular weight greater than about 500,000 g/mol to an oil-based drilling fluid to make a thermally stable drilling fluid system. The concentration of SBR is about 1 to about 6 pounds per barrel. According to the patent, the resultant drilling mud system exhibits fluid loss control at high temperatures and high pressure conditions. The reference compared the fluid loss (mL/30 min) of a block styrene-butadiene copolymer (30 wt. % polystyrene) to a random SBR copolymer. The fluid loss property of the random SBR is disclosed to be significantly better than a styrenic block copolymer.

U.S. Pat. No. 5,925,182 discloses adding oil-soluble block or random copolymers to water-based drilling muds. The copolymers comprise styrene-isoprene and styrene-butadiene and can be present in the fluid in an amount ranging from about 0.1 to about 10 wt. %. The copolymer provides a stable liquid composition for use in water-based drilling fluid. However, the reference does not disclose that radial block copolymers of styrene and butadiene significantly reduce fluid loss in drilling muds.

U.S. Pat. No. 6,034,037 discloses a synthetic oil-based drilling fluid containing up to 20 pounds per barrel of a polymeric fluid loss control agent comprising a polymer consisting of at least two monomers selected from the group consisting of styrene, butadiene, and isoprene. Table A discloses a typical drilling fluid containing synthetic oil, lime, fluid loss control agent, organophilic clay, brine, weighting agent, and a styrene-butadiene copolymer.

U.S. Pat. No. 6,017,854 discloses a non-aqueous drilling fluid containing styrenic block copolymers to help prevent fluid loss. As disclosed in the U.S. Pat. No. 6,017,854, selectively hydrogenated isoprene-styrene block copolymers are employed as a fluid loss agent for a low toxicity synthetic drilling fluid. The examples of the patent disclose use of a linear styrene-ethylene/propylene (SEP) comprising 28% styrene and 72% ethylene/propylene. The total block copolymer concentration in the drilling mud is from about 0.01 to 10 wt. %.

WO 2004/022668 claims an oil-based mud containing up to 10 wt. % of a radial styrene-butadiene-styrene copolymer having 25 wt. % or more polystyrene to improve the fluid loss of the drilling mud by decreasing the high temperature, high pressure fluid loss value. Also disclosed within the specification is styrene-ethylene/propylene copolymer (a selectively hydrogenated isoprene-styrene block copolymer).

We have discovered that a selectively hydrogenated isoprene-styrene block copolymer containing at least 40 wt. % or more polystyrene, improves the fluid loss property of a drilling fluid when compared to a drilling fluid that does not contain the copolymer.

SUMMARY OF THE INVENTION

The object of this invention is to provide an oil-based drilling fluid composition having improved fluid loss properties that contains a diblock copolymer containing at least 40 wt. % polystyrene content.

It is a further object of the invention to provide a drilling fluid composition that contains up to about 10 wt. % of a diblock copolymer containing at least 40 wt. % or more polystyrene.

It is still a further object of the invention to provide a drilling system using the new drilling fluid composition having improved fluid loss properties, in particular, a drilling mud that contains about 0.5 pounds per barrel (42 gallons) to about 10 pounds per barrel of a selectively hydrogenated isoprene-styrene diblock copolymer having a polystyrene content of at least 40 wt. %. For a mud with a density of about 12 pounds per gallon (ppg), this corresponds to about 0.1 wt. % to about 2 wt. % of block copolymer.

DETAILED DESCRIPTION OF THE INVENTION

This invention relates to a selectively hydrogenated isoprene-styrene block copolymer added to an oil-based drilling mud composition that unexpectedly results in significant improvement in fluid loss control, especially under high temperature (≥300° F., and preferably ≥350° F.) and high pressure (≥500 psi) conditions. A drilling mud is used in combination with a rotating drill bit to drill a borehole in a subterranean formation. The drilling method comprises the steps of rotating a drill bit in the borehole and introducing the drilling fluid composition into the borehole to pick up the drill cuttings and carrying at least a portion of the drill cuttings out of the borehole. The drilling system employed in such method comprises the subterranean formation, the borehole penetrating the subterranean formation, the drill bit suspended in the borehole, and the drill fluid located in the borehole and proximate to the drill bit.

The drilling fluid composition for purposes of this invention is a fluid having the following ingredients: an oil-based drilling mud, a weighting agent, a block copolymer, and other optional ingredients. The drilling mud is a composition having the following components: oil, brine, lime, a gelling agent, an emulsifier, and a wetting agent. The oil can be diesel oil, a low toxicity synthetic oil such as ESCAID® 110 (Exxon Mobile Corp.), NOVAPLUS® drilling fluid (from M-1 Drilling Muds L.L.C.) or SARALINE® (Unical Corp), an alpha-olefinic oil, an internal olefin such as AlphaPlus® C1618 (Chevron Phillips Chemical Co.) or a non-synthetic oil such as mineral oil. Low toxicity oil is one that is not carcinogenic and is environmentally friendly, and is safer than conventional diesel oil. The brine typically includes a salt such as calcium chloride. Typically, the oil:brine ratio is in the range of 70:30 (w/w). The gelling agent can be an organophilic clay such as amine-modified hectorite, bentonite and mixtures thereof. The organophilic clay increases the low shear viscosity of the drilling fluid composition which prevents the weighting agent from settling. The emulsifiers and wetting agents include surfactants and ionic surfactants such as fatty acids, amines, amides and organic sulphonates and mixtures thereof. The weighting agents include materials such as barite (barium sulfate), hematatite, calcium carbonate, galena, siderite and mixtures thereof. The weighting agent is added to the drilling mud to adjust the density, typically to between 9 and 18 pounds per gallon. Typical other ingredients may include modified lignite, polymers, oxidized asphalt, gilsonite, humates prepared by reacting humic acid with amide or polyalkyl polyamines. These other ingredients can aid in controlling fluid loss at low temperatures.

While it is known to add diblock styrene-isoprene block copolymers to drilling muds as fluid loss control agents, the fluid loss agent of the present invention is a selectively hydrogenated isoprene-styrene block copolymer having at least 40 wt. % polystyrene content, with a polystyrene block true molecular weight of at least 60 kg/mole, and a total diblock apparent molecular weight of at least 160 kg/mole. As used herein, the term "molecular weights" refers to the true molecular weight in g/mol of the polymer or block of the copolymer. The molecular weights referred to in this specification and claims can be measured with gel permeation chromatography (GPC) using polystyrene calibration standards, such as is done according to ASTM D5296. GPC is a well-known method wherein polymers are separated according to molecular size, the largest molecule eluting first. The chromatograph is calibrated using commercially available polystyrene molecular weight standards. The molecular weight of polymers measured using GPC so calibrated are styrene equivalent, or apparent, molecular weights. The apparent molecular weight may be converted to true molecular weight when the composition and structure of the polymer are known. In the case of the present invention knowledge of the styrene content of the polymer and the vinyl content of the isoprene segments is sufficient to determine the true molecular weight. The detector used is preferably a combination ultraviolet and refractive index detector.

The block copolymer of the present invention is a selectively hydrogenated isoprene-styrene diblock copolymer. The selectively hydrogenated isoprene-styrene diblock copolymer has a polystyrene content of at least 40 wt. %, preferably 40 to 50 wt. % polystyrene content.

Anionic polymerization of monoalkenyl arenes, such as styrene, and conjugated dienes, such as isoprene, with lithium initiators is well known as described in U.S. Pat. No. 4,039,593 and Re 27,145. Polymerization commences with monolithium, dilithium or polylithium initiators which build a living polymer backbone at each lithium site.

In general, the polymers useful in this invention may be prepared by contacting the monomer or monomers with an organoalkali metal compound in a suitable solvent at a temperature range of from −150° to 300° C., preferably at a temperature range of 0 to 100° C. Particularly effective polymerization initiators are organolithium compounds having the general formula RLi wherein R is an aliphatic, cycloaliphatic, or alkyl-substituted cyloaliphatic radical having from 1 to 20 carbon atoms. Suitable solvents include aliphatic hydrocarbons such as butane, pentane, hexane, heptanes or cyclohexane or cycloheptane, benzene, toluene and xylene and ethers such as tetrahydrofuran or diethylether.

Selective hydrogenation can be carried out via any of the several processes known in the prior art. For example, such hydrogenation has been accomplished using methods such as those taught in, for example, U.S. Pat. Nos. 3,595,942; 3,634,549; 3,670,054; 3,700,633; and Re. 27,145, the disclosures of which are incorporated herein by reference. These methods operate to hydrogenate polymers containing aromatic or ethylenic unsaturation and are based upon operation of a suitable catalyst. Such catalyst, or catalyst precursor, preferably comprises a Group VIII metal such as nickel or cobalt which is combined with a suitable reducing agent such as an aluminum alkyl or hydride of a metal selected from Groups I-A, II-A and III-B of the Periodic Table of the Elements, particularly lithium, magnesium or aluminum. This preparation can be accomplished in a suitable solvent or diluent at a temperature from about 20° C. to about 80° C. Other catalysts that are useful include titanium based catalyst systems.

Selective hydrogenation can be carried out under such conditions that at least about 90 mol % of the isoprene double bonds have been reduced, and between 0 and 10 mol % of the arene double bonds present in the polymerized styrene units have been reduced. Preferred ranges are at least about 95 mol % of the isoprene double bonds reduced, and more preferably about 98 mol % of the isoprene double bonds are reduced.

Preferably the polystyrene block has a true molecular weight of 60 to 110 kg/mole, and more preferably 65 to 105 kg/mole, and most preferably 70 to 100 kg/mole. Likewise the total diblock apparent molecular weight is preferably 160 to 360 kg/mole, more preferably 160 to 340 kg/mole and most preferably 200 to 320.

The concentration of the block copolymer in the drilling fluid composition is in the range of about 0.5 to about 10 pounds per barrel (ppb) of the oil-based drilling mud, preferably about 1 to about 6 ppb of the oil-based drilling mud, and most preferably 2 to 4 ppb.

It is also preferable for the drilling fluid composition to include an organophillic clay at about 2-10, preferably 4-8, most preferably 3-4 ppb. The exact amount of clay will depend on the polymer concentration and is chosen so that the combination of polymer and clay provides adequate low-shear rheology for particle suspension without increasing the high-shear rheology to the point where pressure during circulation becomes excessive.

The ability of the solid components of the mud to rapidly form a thin filter cake of low permeability on a porous formation is a desirable property closely related to bore-hole stability, freedom of movement of the drill string, and the information and production derived from the hole.

When drilling fluid, carrying suspended solids, comes into contact with a porous, permeable formation such as sandstone, the drilling mud solid particles immediately enter the openings. As the individual pores become bridged by the larger particles, successively smaller particles are filtered out until only a small amount of the liquid passes through the openings into the formation.

Thus, the drilling mud solids are deposited as a filter cake on the bore-hole wall. The thickness of the cake is related to the type and concentration of solids suspended in the mud. As soon as bridging of the openings has occurred, the sealing property of the mud becomes dependent upon the amount and physical state of the clay and other colloidal materials in the mud, and not on the permeability of the formation. The filter cake thickness is reported in increments of 1/32 inch. For best results a thickness of about 2/32 to about 4/32 inch is the preferred range. When the thickness is less than about 2/32 inch, the filter cake is too porous and when the thickness is greater about 6/32 inch, freedom of movement for the drill string is impeded.

EXAMPLES

Samples of drilling muds were prepared as described below. Hot-roll aging was conducted at 300° F. under 100 psi of nitrogen or 350° F. for 16 hrs under 150 psi of nitrogen. Thereafter, the rheological testing was conducted at the temperature stated. The shear stress measurements were made using an OFITE Model 900 viscometer at 3, 6, 100, 200, 300 and 600 rpm at 70° F., 120° F., and 150° F.; the 10 second gel strength measurements were made using an OFITE Model 900 viscometer at 3 rpm at 70° F., 120° F., and 150° F. The results are reported as Dial Readings (DR) in units of lb./100 ft.$^2$. The dial readings were used to calculate the Plastic Viscosity (PV) (PV=DR$_{600}$−DR$_{300}$; cP), Yield Point (YP) (YP=PV−DR$_{300}$; lbs./100 ft.$^2$) and Low Shear Yield Point (LSYP) (LSYP=2*DR$_3$−DR$_6$; lbs/100 ft.$^2$). The gel strength is reported in lbs./100 ft.$^2$. Fluid loss was measured at 300° F. using a Fann Series 387 (500 mL) HTHP (high temperature, high pressure) Filter Press using a pressure drop of 500 psi (600 psi on the high pressure side, 100 psi on the low pressure side) according to API 13A; fluid loss is reported as twice the volume recovered in 30 minutes. Electrical stability was measures at 120° F. using an Emulsion Stability Meter (part#131-50) according to API 13B-2. Typically preferred ranges of these variables for fluids aged at 300° F. are:

PV: ≤45 cP at 120° F.; preferably less than 40 cp
YP: a range of about 15-45 lb./100 ft.$^2$ at 120° F., preferably 20-30 lb./100 ft.$^2$; wherein 1.0<PV/YP<2.0, preferably 1.2<PV/YP<1.5;
LSYP: ≥2 lb./100 ft.$^2$ at 120° F., preferably in a range of about 2-10 lb./100 ft.$^2$ at 120° F.; but >0 at 150° F.;
10 sec. gel: ≥3 lb./100 ft.$^2$ at 120° F., and preferably in a range of about 3-10 lb./100 ft.$^2$ at 120° F.; and
HTHP fluid loss: <12 mL at 300° F., and preferably <8 mL.

Example 1

The selectively hydrogenated isoprene-styrene diblock copolymers of the present invention are comprised of at least 40 wt. % styrene. The following two diblock copolymers of the present invention (Polymer A and Polymer B) were made by the well-known sequential anionic polymerization method, followed by hydrogenation. These were compared to Kraton® G1701 and G1702 that are selectively hydrogenated isoprene-styrene diblock copolymers. Table 1 compares the polystyrene content and the true mol. wt. of each of the block copolymers. Polymer A is better at lower temperatures while Polymer B is better for higher temperatures, where the cross over is about 350° F.

TABLE 1

| | PSC (wt. %) | Mol. wt. styrene (kg/mole) | Mol. wt. isoprene (kg/mole) | True mol. wt. diblock (kg/mol) | Apparent mol. wt. diblock (kg/mol) |
|---|---|---|---|---|---|
| Polymer A | 43.7 | 70.5 | 90.9 | 161.4 | 205.5 |
| Polymer B | 40.2 | 96.7 | 143.6 | 240.4 | 310.6 |
| G1701 | 36.6 | 36.3 | 62.9 | 99.1 | 130.1 |
| G1702 | 27.6 | 37.3 | 97.8 | 135.1 | 184.0 |

Example 2

Muds intended for use at temperatures generally less than or equal to about 350° F. were prepared by the following general procedure. Quantities of each material were calculated to prepare a standard (350 mL) lab barrel (equivalent barrel)—one gram of material added to 350 mL of liquid is equivalent to 1 pound of material added to a 42 gallon barrel. Charges of individual components were adjusted to maintain a final density of 12 ppg and an oil:brine ratio of about 70:30. A typical recipe is shown in Table 2. First, the required quantity of the base oil (Escaid® 110) was added to a 16 oz. wide mouth jar. An air-driven Silverson® high shear mixer was used to mix the mud. The mixer was initially set at about 800 RPM. The primary and secondary emulsifiers (Lamberti S.p.A.) were added first. These are liquids and were easily incorporated. The organophillic clay (Claytone® SF) was added next, and allowed to mix for about 10 minutes. The polymer was added next and was also mixed for about 10-15 minutes. Lime was then added and mixed for about 5 minutes. A 25% CaCl$_2$ brine solution was then added and was mixed for about 15 minutes. The simulated drill cuttings (known as OCMA clay which models the behavior of drill cuttings) were added and mixed for about 5 minutes. Then the weighting agent (API barite) was added to bring the weight to 12 ppg for the drilling fluid composition for testing purposes. The barite was added slowly to allow each increment to wet and homogenize before more was added. During this step, the mud builds substantial viscosity and its temperature increases due to friction. If clumps that did not move into the mixing zone were formed during the addition of any of the solid components a wooden stick was used to provide manual mixing. The mud was mixed for an additional 20 minutes following the last barite addition.

A control mud was prepared using no fluid loss additive and a high loading of organophillic clay. The remaining muds were prepared by adding less organophillic clay and adding a commercial fluid loss additive of either a synthetic copolymer based upon succinimide polyacrylates, for example, PLIOLITE DF1, a Goodyear product, in concentrations that vary of from 0.1 to 2.5% by weight, one of two commercially available comparative diblock copolymers with a relatively low polystyrene content (G1701 or G1702), or Polymer A of the present invention. Less clay was added as it was anticipated that the addition of the polymer would increase the viscosity. Lower solids, as can be achieved by substitution of clay with a soluble viscosity modifier, is advantageous from a formation damage perspective. All muds were hot roll aged at 300° F. for 16 hours under 100 psi of nitrogen prior to testing.

TABLE 2

Composition of Muds in Example 2

| Component | Charge (grams) |
|---|---|
| Escaid ® 110 | 171 |
| 25% wt CaCl₂ Brine | 71 |
| Lime | 8 |
| API Barite | 233 |
| Primary Emulsifier | 7 |
| Secondary Emulsifier | 2 |
| Organophillic clay (Claytone ® SF) | 3 to 8 |
| Polymer (S-EP or commercial FLA) | 2 to 4 |
| OCMA clay (Hymod ® Prima) | 10 |

These formulations were tested as indicated above and the results are reported in Tables 3-6 below. The commercial FLA was Pliolite® DF1. The rheology data at 70° F., 120° F. and 150° F. are reported in Tables 3, 4 and 5, respectively. The electrical stability was measured at 120° F. and as such are reported in Table 4; the 300° F. fluid loss results are reported in Table 6. Electrical stability is the amount of voltage to break the emulsion. It is desired to have greater fluid stability and the higher the voltages indicate more stable emulsions.

TABLE 3

70° F. Rheology data for formulations of Example 2

| 70° C.<br>FLA/Clay (ppb/ppb)<br>hot rolled (T° F./t hr) | Control<br>0/8<br>300/16 | Commercial FLA<br>4/4<br>300/16 | G1701<br>4/4<br>300/16 | G1702<br>4/4<br>300/16 | Polymer A<br>4/4<br>300/16 | Polymer A<br>3.5/3.5<br>300/16 | Polymer A<br>3/3<br>300/16 |
|---|---|---|---|---|---|---|---|
| 600 RPM | 117 | 60.5 | 222 | 296 | 212 | 171 | 123 |
| 300 RPM | 74 | 34 | 145 | 195 | 136 | 110 | 74 |
| 200 RPM | 55 | 25 | 111.5 | 146 | 107 | 82 | 56 |
| 100 RPM | 38 | 15 | 73 | 96 | 73 | 54 | 36 |
| 6 RPM | 14.5 | 4.4 | 16 | 23.8 | 20.6 | 13.6 | 7.4 |
| 3 RPM | 12.5 | 3.4 | 11.4 | 17.7 | 15.4 | 10 | 5.3 |
| PV (cP) | 43 | 26.5 | 77 | 101 | 76 | 61 | 49 |
| YP (lb/100 ft²) | 31 | 7.5 | 68 | 94 | 60 | 49 | 25 |
| LSYP (lb/100 ft²) | 10.5 | 2.4 | 6.8 | 11.6 | 10.2 | 6.4 | 3.2 |
| 10 sec gel (lb/100 ft²) | 12 | 4 | 12 | 19 | 16 | 11 | 6 |
| PV/YP | 1.4 | 3.5 | 1.1 | 1.1 | 1.3 | 1.2 | 2.0 |

TABLE 4

120° F. Rheology data and electrical stability for formulations of Example 2

| 120° C.<br>FLA/Clay (ppb/ppb)<br>hot rolled (T° F./t hr) | Control<br>0/8<br>300/16 | Commercial FLA<br>4/4<br>300/16 | G1701<br>4/4<br>300/16 | G1702<br>4/4<br>300/16 | Polymer A<br>4/4<br>300/16 | Polymer A<br>3.5/3.5<br>300/16 | Polymer A<br>3/3<br>300/16 |
|---|---|---|---|---|---|---|---|
| 600 RPM | 60.5 | 39 | 139 | 183 | 132 | 105.5 | 79 |
| 300 RPM | 37 | 19.5 | 92.5 | 127 | 87 | 68 | 48 |
| 200 RPM | 29 | 13 | 71.5 | 95 | 68 | 54 | 37 |
| 100 RPM | 21 | 8 | 46 | 63 | 46 | 36 | 24 |
| 6 RPM | 8.3 | 1.9 | 9.4 | 15 | 12 | 8.6 | 5.1 |
| 3 RPM | 6.7 | 1.4 | 6.9 | 10.9 | 8.8 | 6.2 | 3.8 |
| PV (cP) | 23.5 | 19.5 | 46.5 | 56 | 45 | 37.5 | 31 |
| YP (lb/100 ft²) | 13.5 | 0 | 46 | 71 | 42 | 30.5 | 17 |
| LSYP (lb/100 ft²) | 5.1 | 0.9 | 4.4 | 6.8 | 5.6 | 3.8 | 2.5 |
| 10 sec gel (lb/100 ft²) | 7 | 2 | 7 | 11 | 9 | 7 | 4 |
| PV/YP | 1.7 | — | 1.0 | 0.8 | 1.1 | 1.2 | 1.8 |
| Electrical Stability (V) | 477 | 307 | 364 | 433 | 604 | 609 | 582 |

TABLE 5

150° F. Rheology data for formulations of Example 2

| 150° C.<br>FLA/Clay (ppb/ppb)<br>hot rolled (T° F./t hr) | Control<br>0/8<br>300/16 | Commercial FLA<br>4/4<br>300/16 | G1701<br>4/4<br>300/16 | G1702<br>4/4<br>300/16 | Polymer A<br>4/4<br>300/16 | Polymer A<br>3.5/3.5<br>300/16 | Polymer A<br>3/3<br>300/16 |
|---|---|---|---|---|---|---|---|
| 600 RPM | 51 | 31 | 111 | 139 | 109 | 85.5 | 63 |
| 300 RPM | 30 | 15 | 71 | 91 | 71 | 55 | 37 |
| 200 RPM | 24 | 10 | 54 | 69 | 56 | 43 | 29 |
| 100 RPM | 17 | 6 | 34 | 44 | 38 | 29 | 19 |
| 6 RPM | 6.7 | 1.5 | 7 | 9.1 | 9.7 | 6.8 | 4.1 |
| 3 RPM | 5.7 | 1.2 | 5.1 | 6.5 | 6.9 | 5.1 | 3 |
| PV (cP) | 21 | 16 | 40 | 48 | 38 | 30.5 | 26 |

TABLE 5-continued

150° F. Rheology data for formulations of Example 2

| 150° C.<br>FLA/Clay (ppb/ppb)<br>hot rolled (T° F./t hr) | Control<br>0/8<br>300/16 | Commercial FLA<br>4/4<br>300/16 | G1701<br>4/4<br>300/16 | G1702<br>4/4<br>300/16 | Polymer A<br>4/4<br>300/16 | Polymer A<br>3.5/3.5<br>300/16 | Polymer A<br>3/3<br>300/16 |
|---|---|---|---|---|---|---|---|
| YP (lb/100 ft$^2$) | 9 | 0 | 31 | 43 | 33 | 24.5 | 11 |
| LSYP (lb/100 ft$^2$) | 4.7 | 0.9 | 3.2 | 3.9 | 4.1 | 3.4 | 1.9 |
| 10 sec gel (lb/100 ft$^2$) | 6 | 1 | 6 | 7 | 8 | 6 | 3 |
| PV/YP | 2.3 | — | 1.3 | 1.1 | 1.2 | 1.2 | 2.4 |

TABLE 6

300° F. HTHP fluid loss data for formulations of Example 2

| | Control | Commercial FLA | G1701 | G1702 | Polymer A | Polymer A | Polymer A |
|---|---|---|---|---|---|---|---|
| FLA/Clay (ppb/ppb)<br>hot rolled (T° F./t hr) | 0/8<br>300/16 | 4/4<br>300/16 | 4/4<br>300/16 | 4/4<br>300/16 | 4/4<br>300/16 | 3.5/3.5<br>300/16 | 3/3<br>300/16 |
| Fluid Loss (ml) | 16.4 | 7.6 | 27.2 | 21.2 | 5.2 | 6.8 | 10.4 |
| water (ml) | 1.0 | 0 | 0 | 0 | 0 | 0 | 0 |
| Filter cake thicness (1/23 in.) | 5 | 4 | 8 | 6 | 3 | 4 | 4 |
| Fluid Loss test Temp (° F.) | 300 | 300 | 300 | 300 | 300 | 300 | 300 |

The low-shear rheology of a mud is predictive of its ability to suspend solids. Both comparative diblock copolymers and Polymer A of the present invention increase the low-shear viscosity and 10 second gel strength over the values that are observed with 4 ppb of clay and 4 ppb of the commercial fluid loss additive. This is especially apparent at higher temperatures (see Table 5), where only a negligible yield point, low shear yield point and 10 sec. gel strength are observed when only the commercial fluid loss additive and clay are present. The addition of nearly twice as much clay is required to achieve comparable values in the absence of the diblock copolymer. In each of Tables 3-5, it can be seen that the comparative diblock copolymers and Polymer A of the present invention have a similar impact on the rheology at 4 ppb, however, only addition of Polymer A results in a substantial improvement in fluid loss performance. The mud containing 4 ppb of Polymer A suffers only 5.2 mL of fluid loss, an almost 3-fold improvement over the control (16.4 mL). At the same loading, the commercial fluid loss additive is not as effective, with the mud exhibiting 7.6 mL of fluid loss. The clay and polymer loadings can be adjusted to lower the Plastic Viscosity, and hence improve pumpability, while maintain reasonably good fluid loss performance. The mud containing 3.5 ppb each of clay and Polymer A exhibits a good balance of high shear viscosity, low shear viscosity, and fluid loss, as defined above. Polymer A shows improved fluid loss performance as compared to commercial fluid loss additive at the same loading and comparable performance with lower loading (3.5 vs 4 lb/bbl). As seen in Tables 4 and 5, and the mud modified with the commercial fluid loss additive has no YP at 120° F. and 150° F.

Example 3

A 12 ppg mud intended for exposure to higher temperatures (≥ about 350° F.) was prepared according to the general procedure described in Example 2 except that an organophillic clay that is known to be a more effective at higher temperatures, Bentone® 38, was used instead Claytone® SF. The basic recipe is described in Table 7. These muds were hot-roll aged at 350° F. for 16 hours under 150 psi of nitrogen prior to testing. Thereafter, the rheological testing was conducted at the temperature stated.

TABLE 7

Composition of Muds in Example 3

| Component | Charge (grams) |
|---|---|
| Escaid ® 110 | 171 |
| 25% wt CaCl$_2$ Brine | 71 |
| Lime | 8 |
| Barite | 233 |
| Primary Emulsifier | 7 |
| Secondary Emulsifier | 2 |
| Organophillic clay (Bentone ® 38) | 4 |
| Polymer (S-EP or Pliolite ® DF1) | 4 |
| OCMA clay (Hymod ® Prima) | 10 |

These formulations were tested as indicated above and the data are reported in Tables 7-9 below. The commercial fluid loss additive (FLA) was Pliolite® DF1. The rheology data at 70° F., 120° F. and 150° F. are reported in Tables 7, 8 and 9, respectively. The electrical stability was tested at 120° F. and are reported in Table 8, while the fluid loss was tested at 300° F. and the HTHP fluid loss data are reported in Table 11.

TABLE 8

70° F. Rheology for formulations of Example 3

| 70° C.<br>FLA/Clay (ppb/ppb)<br>hot rolled (T ° F./t hr) | Commercial FLA<br>4/4<br>350/16 | Polymer A<br>4/4<br>350/16 | Polymer B<br>4/4<br>350/16 |
|---|---|---|---|
| 600 RPM | 93 | 227 | 282 |
| 300 RPM | 55 | 145 | 183 |
| 200 RPM | 40 | 111 | 137 |
| 100 RPM | 24 | 72 | 90 |
| 6 RPM | 4.9 | 15.2 | 20.1 |
| 3 RPM | 3.7 | 10.8 | 14.7 |
| PV (cP) | 38 | 82 | 99 |
| YP (lb/100 ft$^2$) | 17 | 63 | 84 |
| LSYP (lb/100 ft$^2$) | 2.5 | 6.4 | 9.3 |
| 10 sec gel (lb/100 ft$^2$) | 4 | 12 | 16 |
| PV/YP | 2.2 | 1.3 | 1.2 |

TABLE 9

120° F. Rheology data and electrical stability for formulations of Example 3

| 120° C.<br>FLA/Clay (ppb/ppb)<br>hot rolled (T ° F./t hr) | Commercial FLA<br>4/4<br>350/16 | Polymer A<br>4/4<br>350/16 | Polymer B<br>4/4<br>350/16 |
|---|---|---|---|
| 600 RPM | 51 | 147 | 181 |
| 300 RPM | 27 | 98 | 120 |
| 200 RPM | 19 | 76 | 91 |
| 100 RPM | 11 | 48.5 | 59 |
| 6 RPM | 1.7 | 9.2 | 13.1 |
| 3 RPM | 1.2 | 6.5 | 9.2 |
| PV (cP) | 24 | 49 | 61 |
| YP (lb/100 ft$^2$) | 3 | 49 | 59 |
| LSYP (lb/100 ft$^2$) | 0.7 | 3.8 | 5.3 |
| 10 sec gel (lb/100 ft$^2$) | 1 | 7 | 10 |
| PV/YP | 8.0 | 1.0 | 1.0 |
| Electrical Stability (V) | 591 | 612 | 525 |

TABLE 10

150° F. Rheology data for formulations of Example 3

| 150° C.<br>FLA/Clay (ppb/ppb)<br>hot rolled (T ° F./t hr) | Commercial FLA<br>4/4<br>350/16 | Polymer A<br>4/4<br>350/16 | Polymer B<br>4/4<br>350/16 |
|---|---|---|---|
| 600 RPM | 40 | 117 | 144 |
| 300 RPM | 19 | 76 | 95 |
| 200 RPM | 13.5 | 59 | 72 |
| 100 RPM | 7.66 | 37 | 47 |
| 6 RPM | 1.1 | 6.7 | 9.9 |
| 3 RPM | 0.9 | 4.4 | 6.7 |
| PV (cP) | 21 | 41 | 49 |
| YP (lb/100 ft$^2$) | 0 | 35 | 46 |
| LSYP (lb/100 ft$^2$) | 0.7 | 2.1 | 3.5 |
| 10 sec gel (lb/100 ft$^2$) | 1 | 5 | 7 |
| PV/YP | — | 1.2 | 1.1 |

TABLE 11

300° F. HTHP fluid loss data for formulations of Example 3

| | Commercial FLA | Polymer A | Polymer B |
|---|---|---|---|
| FLA/Clay (ppb/ppb) | 4/4 | 4/4 | 4/4 |
| hot rolled (T ° F./t hr) | 350/16 | 350/16 | 350/16 |
| Fluid Loss (ml) | 20.8 | 42 | 8 |
| water (ml) | 0 | 1 | 0 |
| Filter cake thickness (1/32 in.) | 24 | 12 | 4 |

Examination of the data in Tables 8-11 illustrates the importance of choosing a polymer structure, particularly a styrene block size, based on the temperature requirements of the drilling fluid. While both Polymer A and Polymer B increase the low-shear rheology relative to the mud formulated using the commercial fluid loss additive, at higher temperatures only Polymer B effectively inhibits fluid loss. The fluid loss is decreased by more than 2.5-fold relative to the control prepared with a commercial fluid loss additive by the addition of the same quantity of Polymer B.

The Examples herein show that oil-based drilling fluid compositions containing selectively hydrogenated isoprene-styrene diblock copolymers with more than 40 wt. % polystyrene content, provide lower/better HTHP (high temperature, high pressure) fluid loss than the compositions containing comparative diblock copolymers known in the art. However it is not the weight percent of styrene alone that provided the lower/better HTHP fluid loss. In the present invention the advantages are believed to result from a combination of features including composition of the blocks, which provides for a sufficient degree of phase separation and/or association of the polymer with itself or the other components, the total molecular weight, which provides for the appropriate rheological properties such as overall drilling fluid composition viscosity, and the selectively hydrogenated character, which provides for thermal stability of the polymer in the drilling environment. Further, it is shown that the addition of the polymers of the present invention results in an increase in low shear viscosity and gel strength, particularly at high temperatures, which improves particle suspension.

Thus it is apparent that there has been provided, in accordance with the invention, a drilling mud compositions using novel diblock copolymers that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly it is intended to embrace all such alternatives, modifications and variations as fall within the spirit and broad scope of the appended claims.

The invention claimed is:

1. A drilling fluid comprising an oil-based mud and a selectively hydrogenated isoprene-styrene diblock copolymer having at least a 40 wt. % polystyrene content and having an apparent total molecular weight of at least 160 kg/mole, wherein the fluid loss property of the drilling fluid is reduced.

2. The drilling fluid composition according to claim 1 in which the selectively hydrogenated isoprene-styrene diblock is added at a concentration of 0.5-10 pounds per barrel (ppb).

3. The drilling fluid composition according to claim 1 in which the hydrogenated isoprene-styrene diblock is added at a concentration of 1-6 pounds per barrel (ppb).

4. The drilling fluid composition according to claim 1 in which the hydrogenated isoprene-styrene diblock is added at a concentration of 2-4 pounds per barrel (ppb).

5. The drilling fluid composition according to claim 1 in which the hydrogenated isoprene-styrene diblock has a polystyrene content of at least 40 wt. % and the polystyrene block true molecular weight is at least 60 kg/mole.

6. The drilling fluid composition according to claim 1, wherein said oil-based mud includes an oil selected from synthetic low toxicity oil, mineral oil, diesel oil, an internal-olefin oil, or an alpha-olefinic oil.

7. The drilling fluid composition according to claim 6, further including a weighting agent.

8. The drilling fluid composition according to claim 7 also comprising an organophillic clay.

9. The drilling fluid composition according to claim 8 in which the concentration of the organophilic clay is in the range of 3-4 ppb.

10. The drilling fluid composition of claim 6, wherein said oil-based mud further includes brine, lime, and emulsifier.

11. A selectively hydrogenated isoprene-styrene diblock copolymer having at least a 40 wt. % polystyrene content and having an apparent total molecular weight of at least 160 kg/mol.

12. The diblock copolymer of claim 11 wherein the true molecular weight of said polystyrene is at least 60 kg/mole.

13. The diblock copolymer of claim 12 wherein true molecular weight of said polystyrene is 60 to 140 kg/mole.

14. The diblock copolymer of claim 13 wherein said true molecular weight of said polystyrene is 60 to 110 kg/mole.

15. The diblock copolymer of claim 14 wherein said true molecular weight of said polystyrene is 65 to 105 kg/mole.

16. The diblock copolymer of claim 11 wherein said apparent total molecular weight is 160 to 360 kg/mole.

17. The diblock copolymer of claim 16 wherein said apparent total molecular weight is 160 to 340 kg/mole.

18. The diblock copolymer of claim 17 wherein said apparent total molecular weight is 200 to 320 kg/mole.

19. The diblock copolymer of claim 11 which has been selectively hydrogenated wherein at least 90 mol % of the isoprene double bonds have been hydrogenated and less than 10 mol % of the styrene double bonds have been hydrogenated.

\* \* \* \* \*